March 3, 1931.  J. C. McCLURKIN  1,794,788
WEED CUTTING ATTACHMENT FOR DITCHERS
Filed Jan. 10, 1930
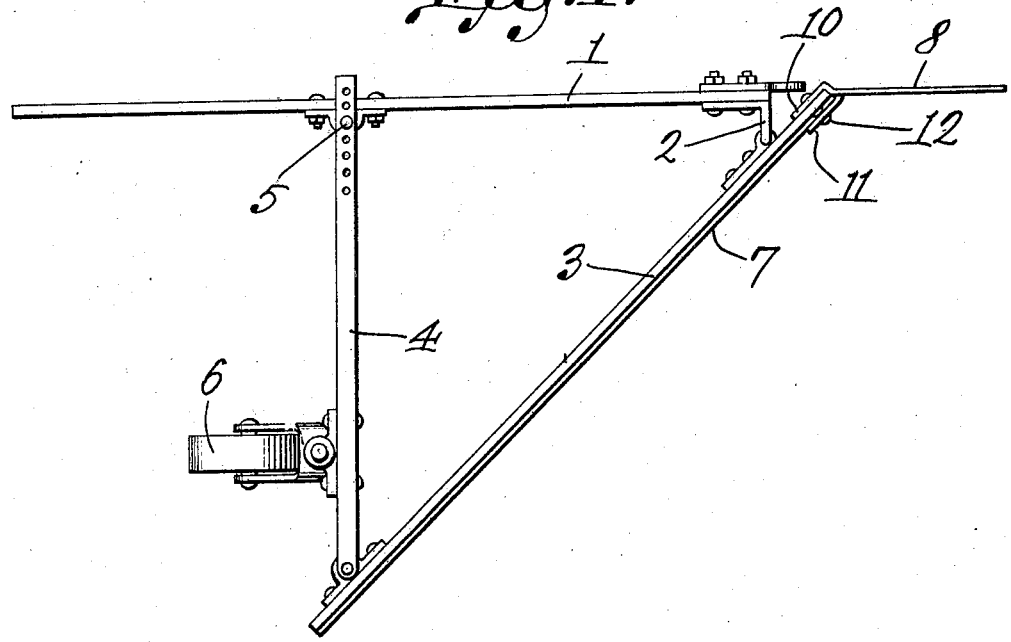
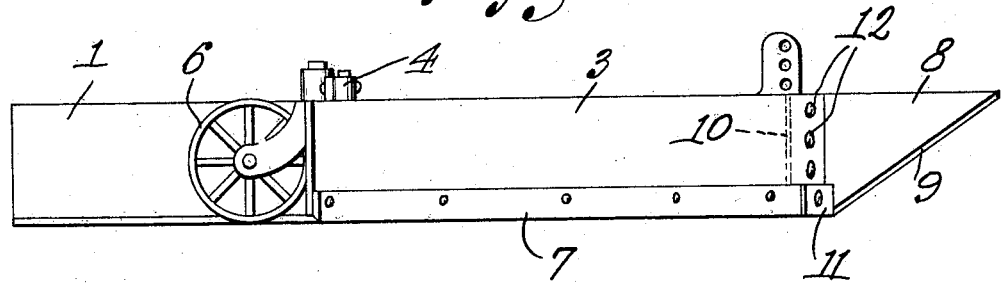
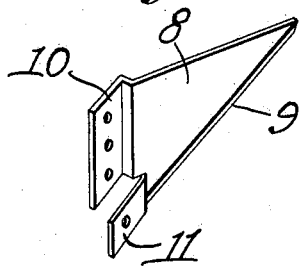
John C. McClurkin, Inventor
By C. A. Snow & Co.
Attorneys Patented Mar. 3, 1931

1,794,788

UNITED STATES PATENT OFFICE

JOHN C. McCLURKIN, OF LAKIN, KANSAS

WEED-CUTTING ATTACHMENT FOR DITCHERS

Application filed January 10, 1930. Serial No. 419,987.

This invention relates to a weed cutting attachment for use on ditchers of that type disclosed, for example, in my co-pending application filed May 13, 1929, Serial Number 362,697.

It is an object of the invention to provide a cutter adapted to be supported in an upright position at the advancing end of a ditcher blade or the blade of a road grader or the like whereby, as the structure is drawn forwardly, the said attachment will cut downwardly through the weeds and provide a clearance for the landside of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a plan view of a ditcher or road scraper having the present improvement combined therewith.

Figure 2 is a side elevation thereof.

Figure 3 is a perspective view of the weed cutting attachment.

Referring to the figures by characters of reference, 1 designates the land side of a ditcher or road scraper and to the front portion thereof is secured a bracket 2 arranged back of and hingedly connected to the mold board 3 of the machine. This mold board is inclined laterally and rearwardly from the front portion of the landside and to the rear portion of the mold board is hingedly attached a brace bar 4. This bar is adjustably connected to the landside as indicated at 5 and may be supported by a caster 6. The construction of the ditcher or scraper constitutes no part of the present invention but is of a type with which the weed cutting attachment is to be used. In this machine there is used a scraping blade 7 that extends longitudinally along the lower edge of the front of the mold board.

The attachment constituting the present invention includes a cutting blade 8 which is triangular and has its lower cutting edge 9 inclined upwardly and forwardly. At the back end of this blade there are provided two wings 10 and 11, arranged at different elevations, the wing 11 being offset forwardly out of line with the wing 10. These wings are extended at obtuse angles to the cutting blade 8 and are adapted to receive between them the adjacent end of the mold board 3 and the blade 7. Suitable fastening means such as rivets or bolts indicated at 12 are extended through the wings and the mold board and serve to hold the blade 8 in forwardly extended position and in alinement with the landside.

When the machine is drawn forwardly the blade 8 will cut forwardly and downwardly with a shearing action through any vegetation in the path thereof and thus a clearance will be provided for the adjacent end of the mold board and for the landside. Obviously the blade 8 can be made of any desired length and weight and, if found necessary, can be suitably braced.

Instead of attaching the blade to the mold board by means of rivets or the like, it can be welded, if so desired.

What is claimed is:

1. The combination with a structure including a landside and a mold board extending laterally and rearwardly therefrom, of a weed cutting attachment including a blade having a forwardly and upwardly inclined cutting edge, upper and lower wings extending from the rear portion of the blade and offset out of alinement, said wings constituting means for extending front and back of the mold board respectively, and means for attaching the wings to the mold board.

2. The combination with a landside and a mold board extending laterally and rearwardly therefrom, of a weed cutting attachment including a blade having a forwardly and upwardly inclined cutting edge, wings extending from the blade and offset in opposite directions to receive between them one end portion of the mold board, said mold board holding the blade in alinement with the landside.

In testimony that I claim the foregoing as my own, I have hereto affixed my signature.

JOHN C. McCLURKIN.